US012377526B1

(12) United States Patent
Felix Leyva

(10) Patent No.: US 12,377,526 B1
(45) Date of Patent: Aug. 5, 2025

(54) INSTALLATION TOOL FOR A PISTON BOOT

(71) Applicant: Jorge Felix Leyva, Homestead, FL (US)

(72) Inventor: Jorge Felix Leyva, Homestead, FL (US)

( * ) Notice: Subject to any disclaimer, the term of this patent is extended or adjusted under 35 U.S.C. 154(b) by 0 days.

(21) Appl. No.: 19/197,088

(22) Filed: May 2, 2025

(51) Int. Cl.
*B25B 27/02* (2006.01)

(52) U.S. Cl.
CPC .................................... *B25B 27/02* (2013.01)

(58) Field of Classification Search
CPC .. F16D 2125/06; F16D 2125/08; B25B 27/02
See application file for complete search history.

(56) References Cited

U.S. PATENT DOCUMENTS 6,502,673 B1 * 1/2003 Toriyama ................ F16D 65/18
188/72.4

FOREIGN PATENT DOCUMENTS

| | | | | | |
|---|---|---|---|---|---|
| DE | 102008057413 | A1 | * 10/2009 | | B25B 27/28 |
| JP | S62261754 | A | * 11/1987 | | |
| JP | H04134938 | U | * 12/1992 | | |

* cited by examiner

*Primary Examiner* — Bayan Salone
(74) *Attorney, Agent, or Firm* — Ruben Alcoba, Esq.

(57) ABSTRACT

An installation tool for a piston boot for a caliper piston of an air disc brake system is provided. The tool includes a hollow cylindrical member defining an internal cavity, a ring member with a central aperture receiving the cylindrical member, and a handle connected to the ring member. The handle features a pivotable lever arm configured to transition the tool between a resting position and a release position. In the resting position, the cylindrical member projects from the ring member to receive the piston boot. In the release position, the ring member pushes the piston boot downward, gradually releasing it from the cylindrical member for installation onto a caliper piston. The invention improves the speed, ease, and consistency of piston boot replacement in air disc brake systems, particularly in heavy vehicles.

4 Claims, 9 Drawing Sheets

View

Cross Section

View

Cross Section

View

Cross Section

INSTALLATION TOOL FOR A PISTON BOOT

BACKGROUND

The present invention is directed to an installation tool for mounting piston boots onto caliper pistons within air disc brake systems for vehicles.

Air disc brake systems are widely used in heavy commercial vehicles, including trucks and trailers, due to their reliable braking performance and ease of service compared to traditional drum brake systems. These systems commonly employ caliper pistons equipped with protective piston boots, which serve to prevent the ingress of contaminants such as dust, debris, moisture, and other environmental elements into the braking mechanism. Maintaining the integrity of these piston boots is critical to the longevity and performance of air disc brake systems.

Currently, the replacement of piston boots is a labor-intensive and time-consuming procedure. Conventional replacement methods often involve manual manipulation of the piston boot over the caliper piston and into its seated position, typically using basic hand tools or improvised devices. This process requires significant effort and precision to avoid damaging the piston boot or improperly seating it, which can compromise the seal's effectiveness and lead to premature brake component wear or failure.

Moreover, the consistency of piston boot installation using existing techniques can vary significantly between service events and technicians, leading to inconsistent results. This inconsistency increases the likelihood of improper installation, which can result in operational inefficiencies, increased maintenance costs, and reduced system reliability.

The present invention addresses the foregoing limitations by providing an improved installation tool for piston boots for caliper pistons of air disc brake systems. The tool features a specially configured hollow cylindrical member, a concentrically positioned ring member, and a pivoting handle mechanism that collectively facilitate the controlled and efficient delivery of a piston boot to its service position within the brake assembly.

Unlike conventional replacement methods, the installation tool of the present invention enables a consistent and reliable installation process by guiding the piston boot along a projected portion of the hollow cylindrical member and gradually releasing it into position through a controlled pivoting motion of the handle. This arrangement reduces the physical effort required by the technician and minimizes the risk of damage to the piston boot during installation.

Furthermore, the invention significantly improves the efficiency of piston boot replacement procedures, reducing service time and labor requirements. The tool ensures a consistent level of installation quality, independent of the operator's experience or technique, thereby enhancing overall brake system reliability and maintenance outcomes. In addition, embodiments of the tool incorporating spring-loaded connections and restraining pins further improve operational safety and precision during use.

Through these and other features, the present invention provides a practical, reliable, and effective solution to the challenges associated with piston boot replacement in heavy vehicle air disc brake systems.

SUMMARY

The present invention relates to an installation tool for a piston boot intended for use with a caliper piston of an air disc brake system. The installation tool comprises a hollow cylindrical member having a sidewall, an upper end, and a lower end that together define an internal cavity. The sidewall includes an exterior surface, the upper end is closed, and the lower end defines a lower aperture.

A ring member is provided, which defines a central aperture and includes an inner surface, an outer surface, an upper surface, and a lower surface. The hollow cylindrical member is concentrically received within the central aperture of the ring member, with the upper end of the cylindrical member oriented upward and the lower end oriented downward. A handle is fixedly attached to the outer surface of the ring member and includes a base arm and a lever arm. The lever arm features a first segment and a second segment connected at an intermediate pivot point, and is configured to pivot relative to the base arm through a first articulated connection to the upper end of the cylindrical member and a second articulated connection at the pivot point.

The installation tool is configured to define a resting position and a release position, with the lever arm enabling a transition between these two positions via its pivoting motion. In the resting position, a projected portion of the hollow cylindrical member extends from the lower surface of the ring member, configured to receive and carry a piston boot to a service location within the air disc brake system. In the release position, the hollow cylindrical member is withdrawn upward relative to the ring member, and the lower surface of the ring member presses the piston boot downward along the exterior sidewall surface of the cylindrical member, gradually releasing the piston boot and delivering it to its intended position around a caliper piston.

Additional embodiments of the invention may include a spring-loaded second articulated connection between the pivot point of the lever arm and the base arm to facilitate controlled movement, as well as restraining pins on the base arm to limit the pivoting amplitude of the lever arm, thereby preventing dislocation of the hollow cylindrical member during use.

The object of the present invention is to provide an installation tool that improves the speed, ease, and consistency of piston boot replacement in air disc brake systems. The invention significantly reduces service time, minimizes manual effort, and ensures repeatable, high-quality installation results, thereby enhancing the reliability and operational efficiency of air disc brake systems, particularly in heavy trucks and commercial vehicles.

BRIEF DESCRIPTION OF THE DRAWINGS

These and other features, aspects, and advantages of the present invention will become better understood with regards to the following description, appended claims, and drawings where:

DESCRIPTION

Figure 1A:
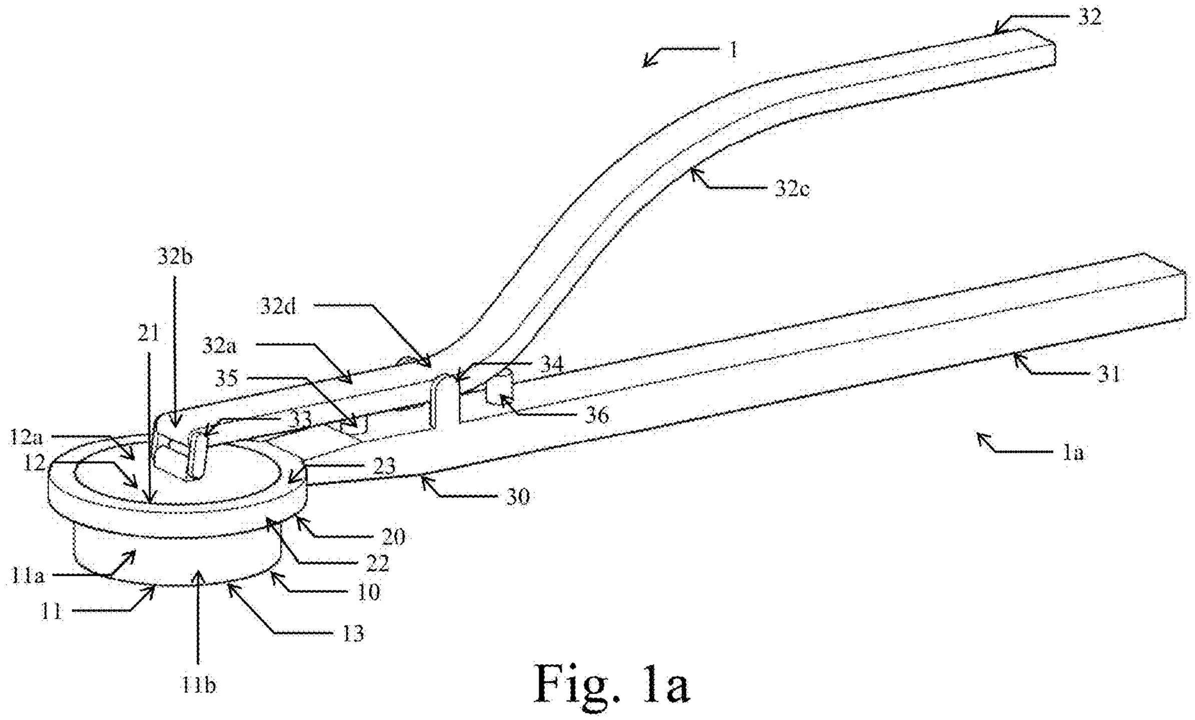
FIG. 1*a* is a top perspective view of the present invention in the resting position.
Figure 1B:
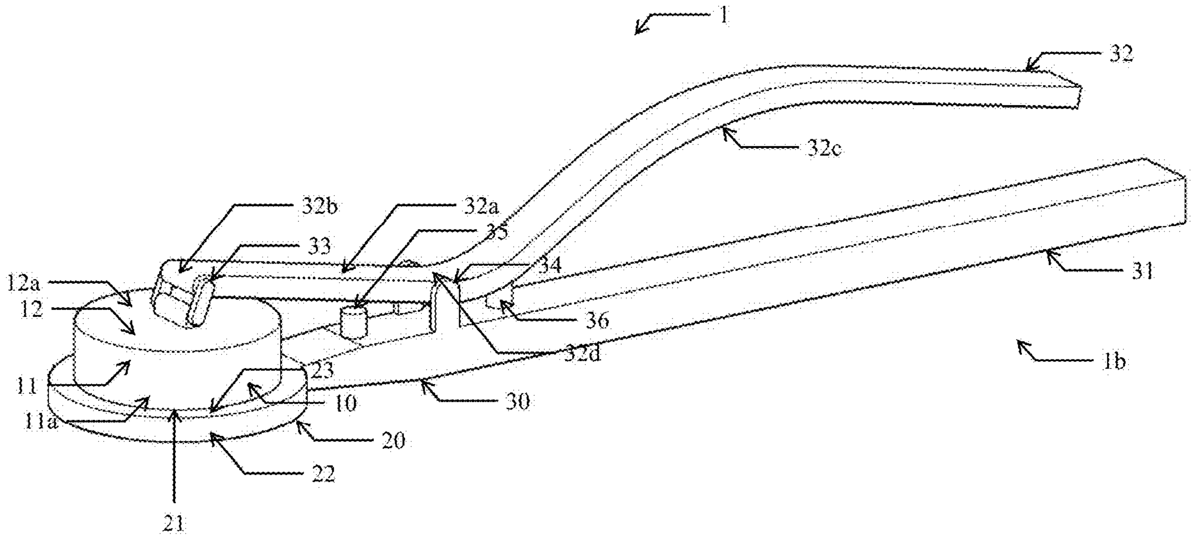
FIG. 1*b* is a top perspective view of the present invention in the release position.
Figure 2A:
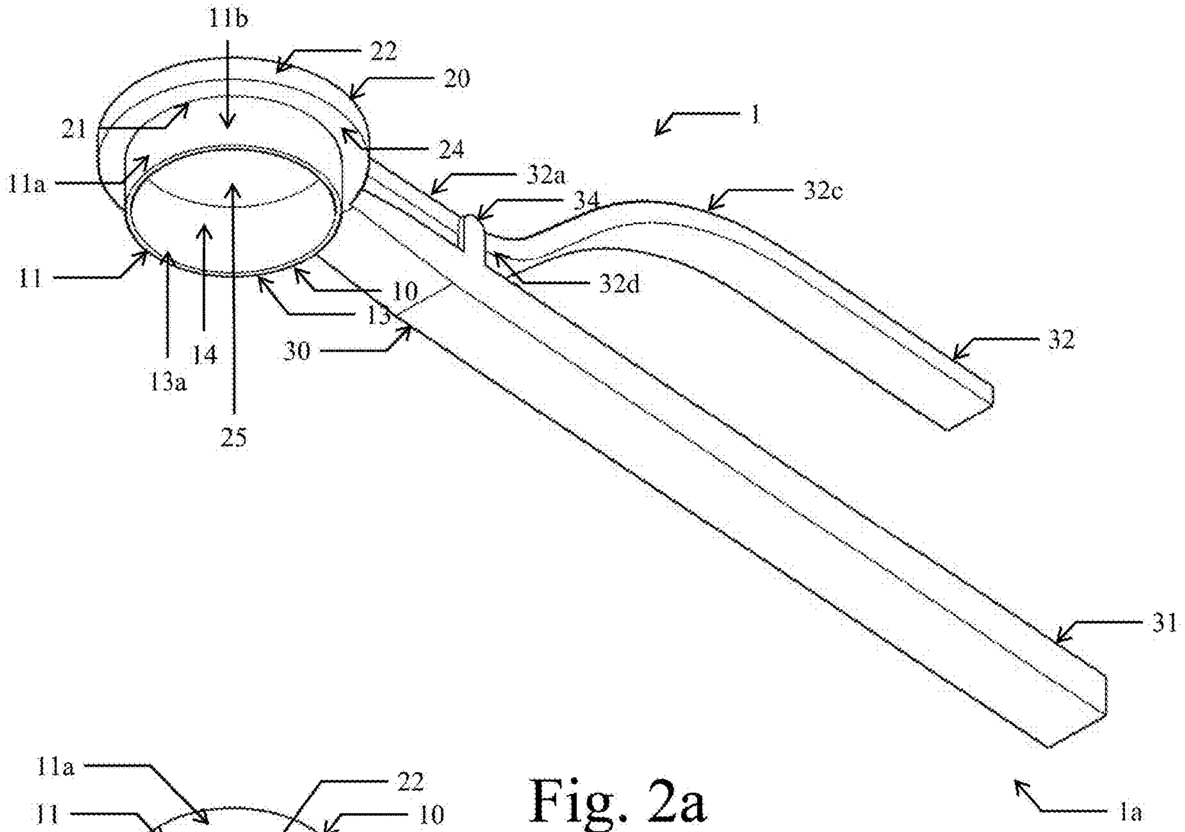
FIG. 2*a* is a bottom perspective view of the present invention in the resting position.
Figure 2B:
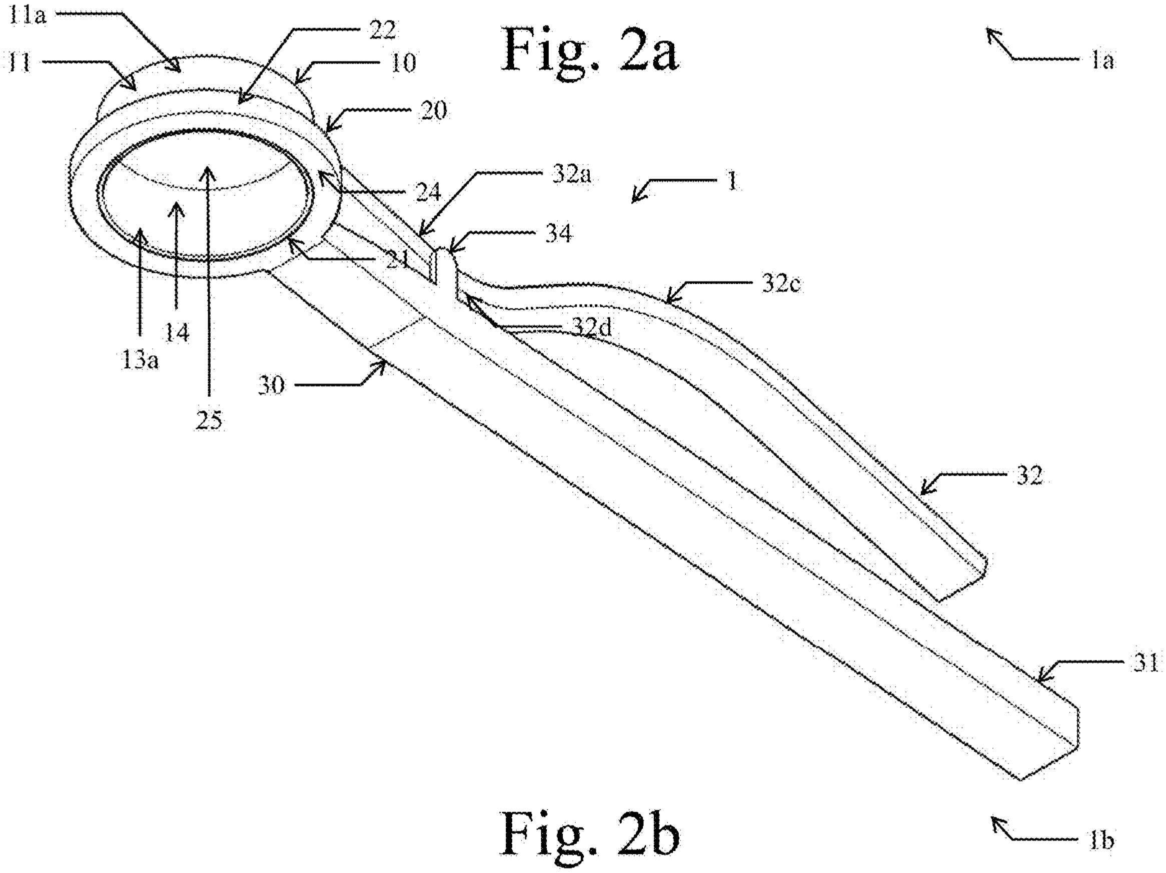
FIG. 2*b* is a bottom perspective view of the present invention in the release position.
Figure 3A:
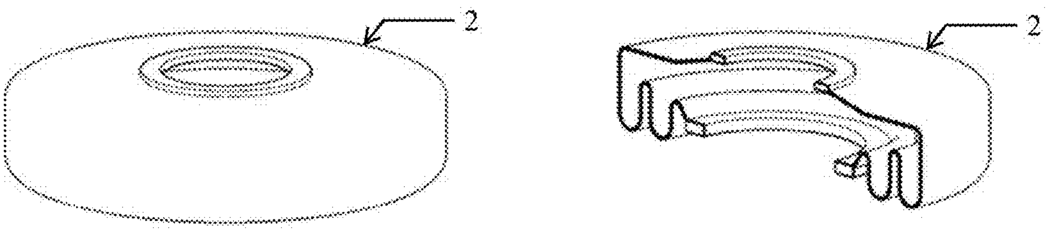
FIG. 3*a* is a top perspective view and cross section of a piston boot for a caliper piston of an air disc brake system.
Figure 3B:
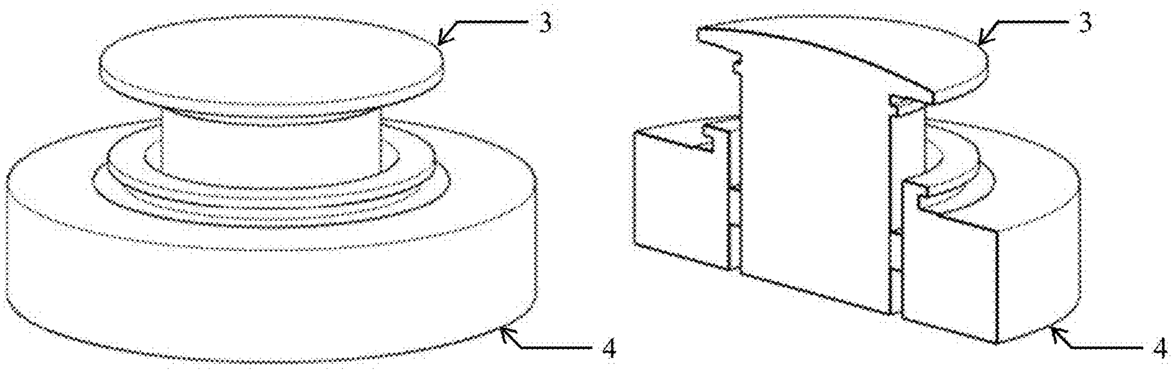
FIG. 3*b* is a top perspective view and cross section of a caliper piston of an air disc brake system.
Figure 3C:
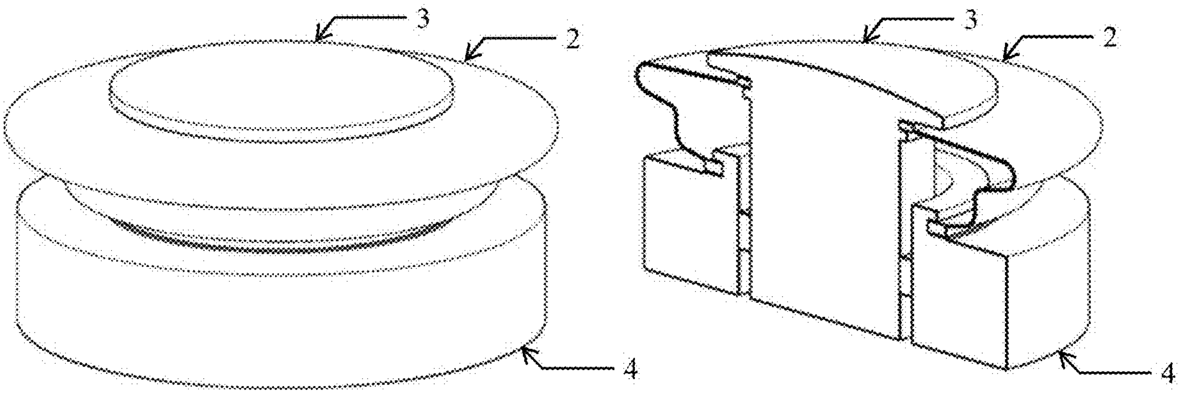
FIG. 3*c* is a top perspective view and cross section of a caliper piston of an air disc brake system protected by a piston boot.
Figure 4A:
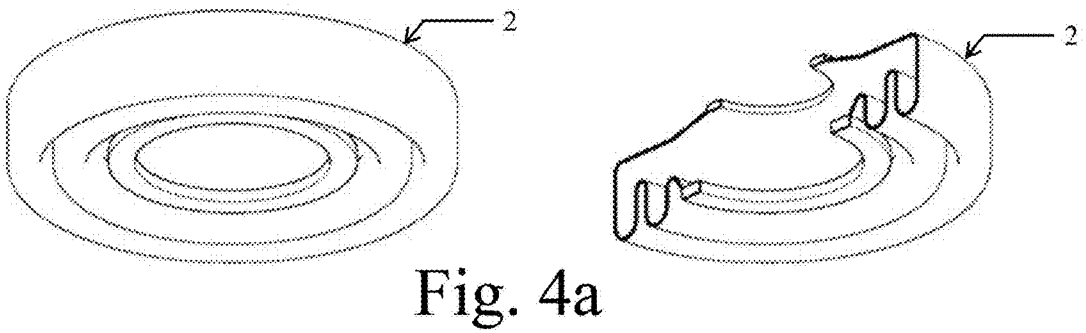
FIG. 4*a* is a bottom perspective view and cross section of a piston boot for a caliper piston of an air disc brake system.
Figure 4B:
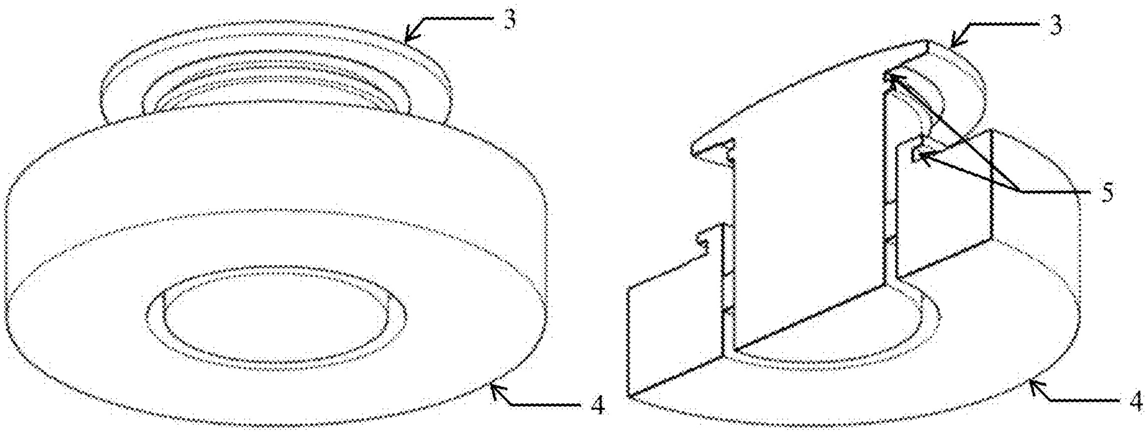
FIG. 4*b* is a bottom perspective view and cross section of a caliper piston of an air disc brake system.
Figure 4C:
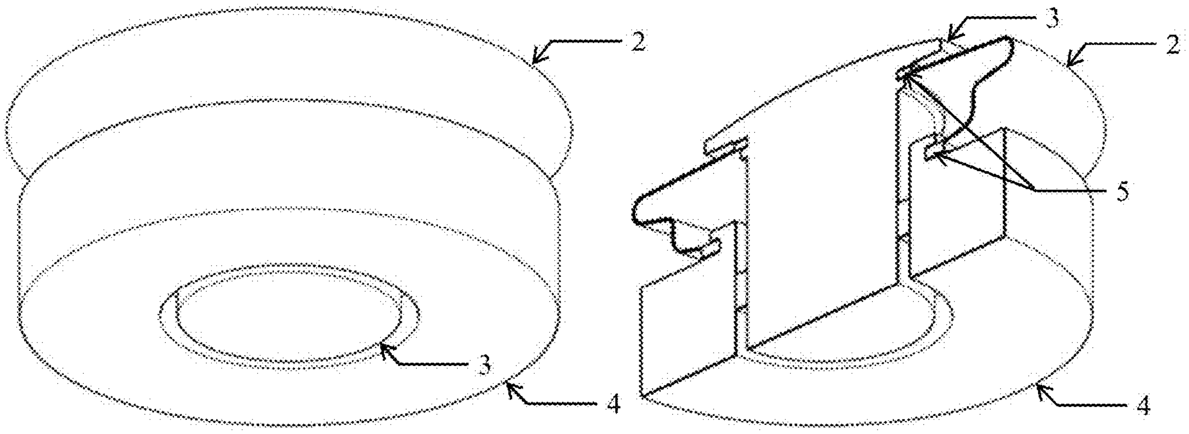
FIG. 4*c* is a bottom perspective view and cross section of a caliper piston of an air disc brake system protected by a piston boot.
Figure 5:
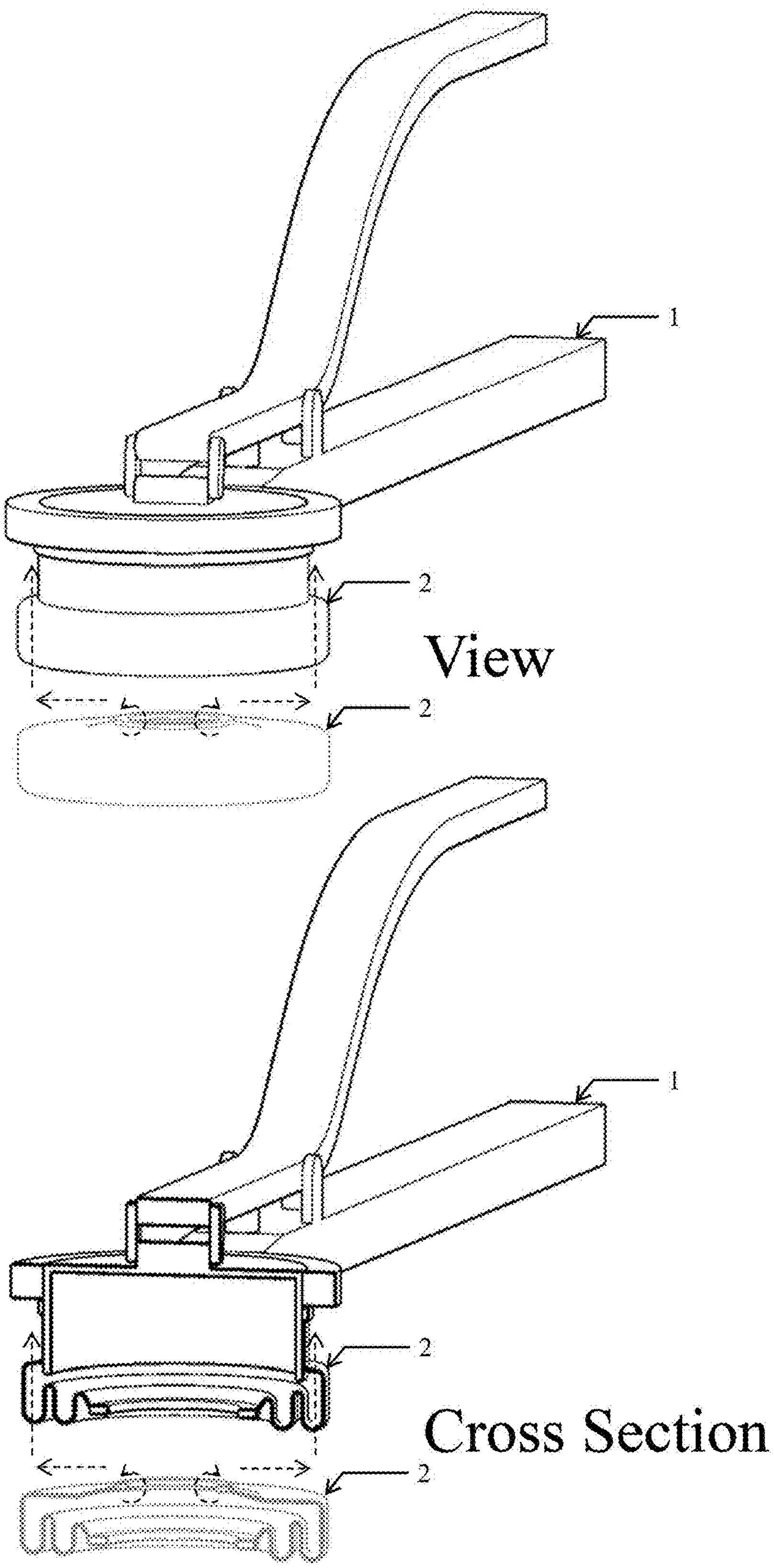
FIG. 5 is a top perspective view and cross section of a piston boot being mounted on the present invention for the subsequent delivery of the piston boot to its service destination within an air disc brake system, the figure shows the first mounting step wherein the piston boot is partially mounted on the present invention.
Figure 6:
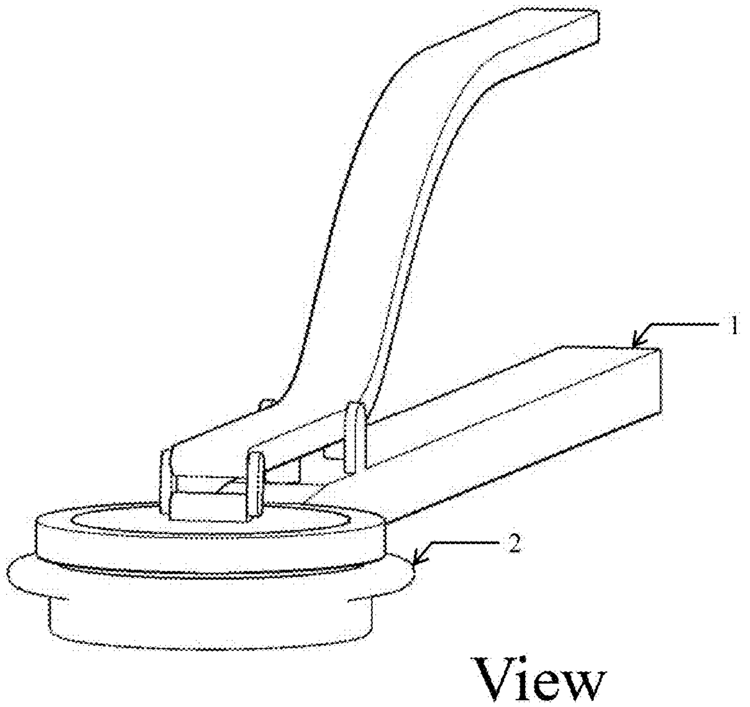
FIG. 6 is a top perspective view and cross section of a piston boot being mounted on the present invention for the subsequent delivery of the piston boot to its service destination within an air disc brake system, the figure shows the second mounting step wherein the piston boot is fully mounted on the present invention.
Figure 6:
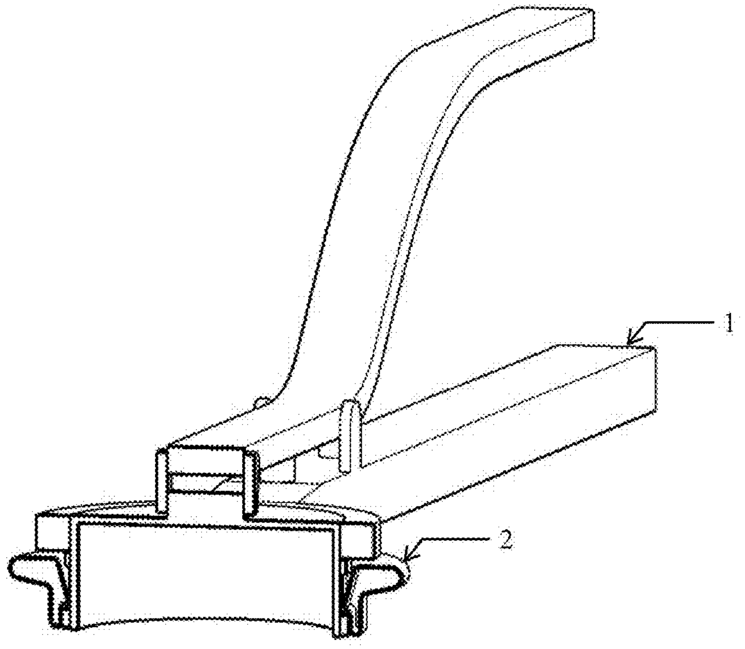
Figure 7:
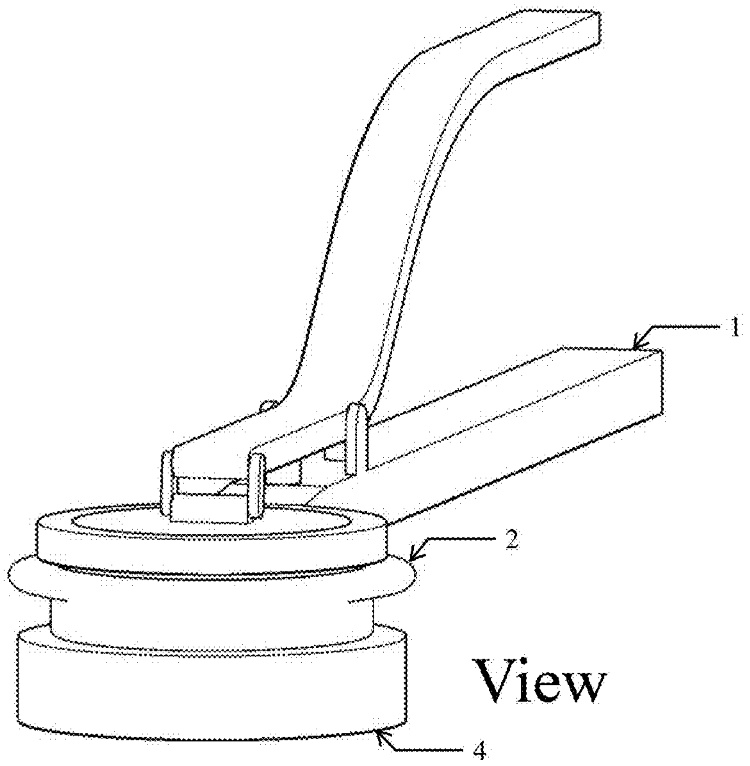
FIG. 7 is a top perspective view and cross section of the present invention in its resting position with a piston boot mounted on it and receiving a caliper piston of an air disc brake system, the figure illustrates the first step for delivering the piston boot to its service destination within the air disc brake system.
Figure 7:
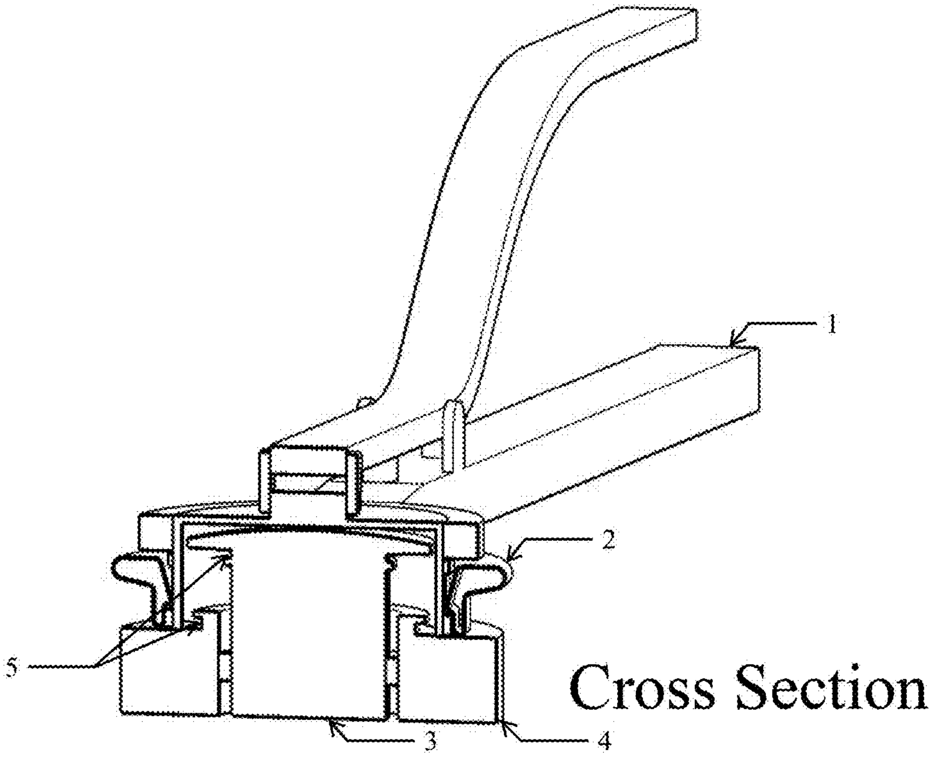
Figure 8:
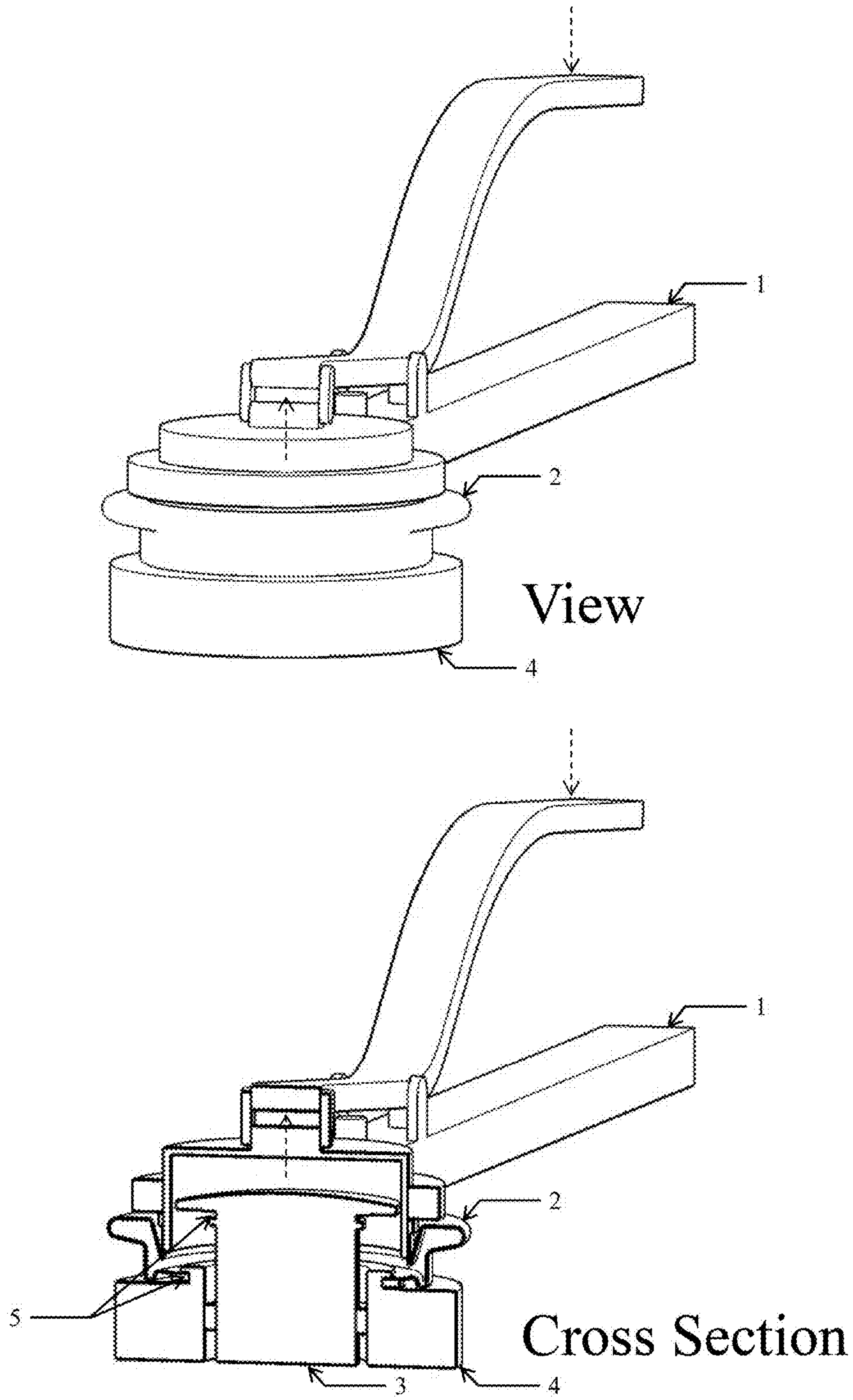
FIG. 8 is a top perspective view and cross section of the present invention transitioning from its resting position to its release position, with a piston boot partially mounted on it and receiving a caliper piston of an air disc brake system, the figure illustrates the second step for delivering the piston boot to its service destination within the air disc brake system, wherein the piston boot is still mounted on the present invention but now it also seats on the air disc brake system.
Figure 9:
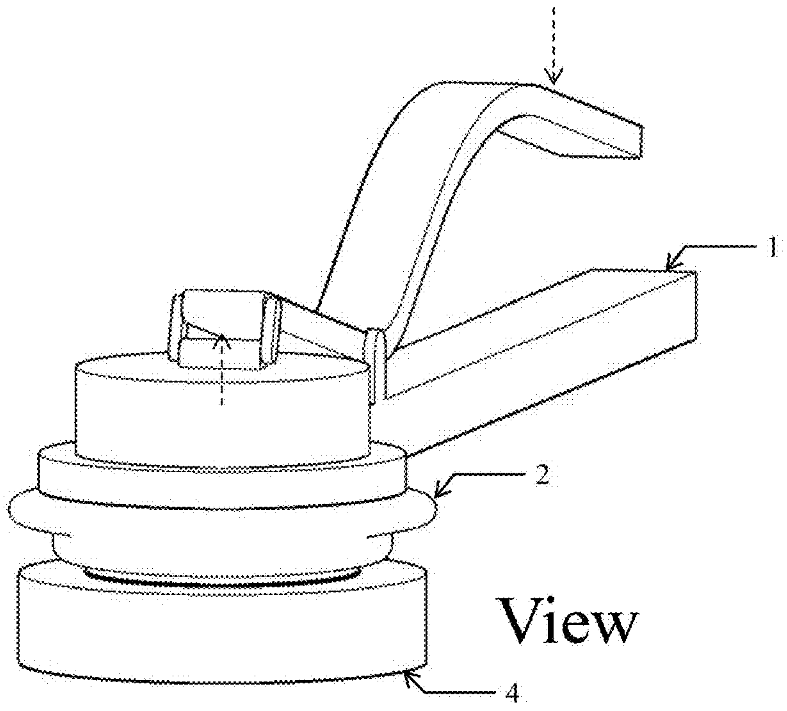
FIG. 9 is a top perspective view and cross section of a caliper piston assembly of an air disc brake system with a fully installed piston boot, the figure illustrates the last step for delivering the piston boot to its service destination within the air disc brake system, wherein the present invention reaches its release position to fully release the piston boot, the piston boot is now fully delivered in its service destination within the air disc brake system effectively protecting it from contaminants, humidity and other foreign matter.
Figure 9:
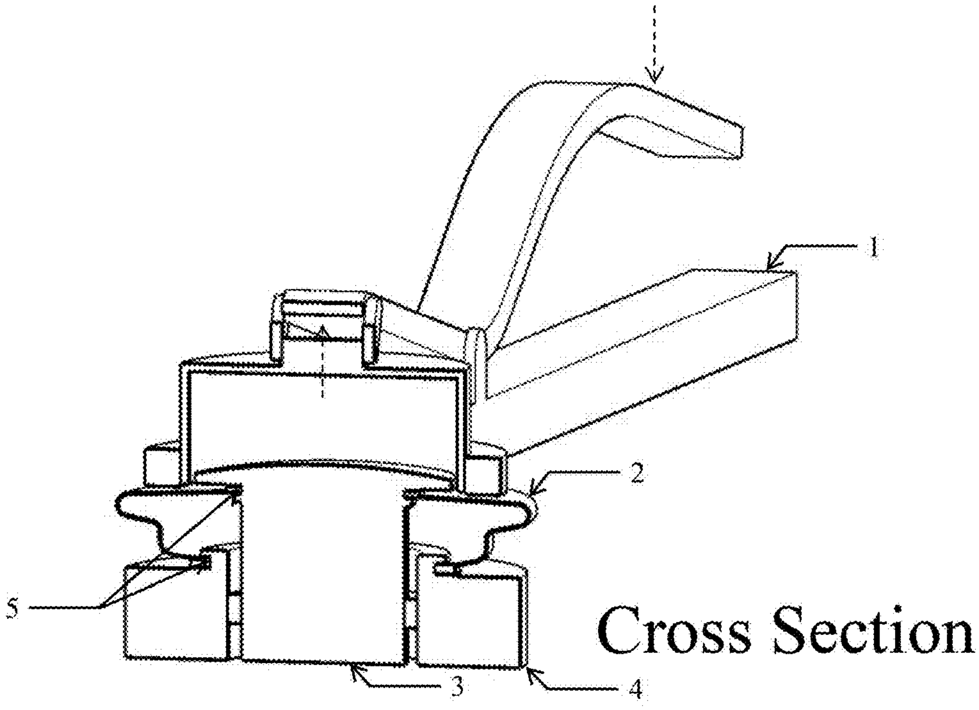

As seen in FIGS. 1*a*-9, the present invention is an installation tool 1 for a piston boot 2 for a caliper piston 3 of an air disc brake system 4.

The installation tool 1 comprises a hollow cylindrical member 10 that has a sidewall 11, an upper end 12 and a lower end 13 that collectively define an internal cavity 14, the sidewall 11 defines an exterior sidewall surface 11*a*, the upper end 12 is closed and defines an exterior upper end surface 12*a*, the lower end 13 is open and defines a lower aperture 13*a*. A ring member 20 that has an inner surface 21, an outer surface 22, an upper surface 23 and a lower surface 24, the inner surface 21 defines a central aperture 25, the hollow cylindrical member 10 concentrically inserts into the central aperture 25 of the ring member 20 with the upper end 12 of the hollow cylindrical member 10 oriented upward and the lower end 13 of the hollow cylindrical member 10 oriented downward. And, a handle 30 fixedly attached to the outer surface 22 of the ring member 20, the handle has a base arm 31 and a lever arm 32, the lever arm 32 defines a first segment 32*a* and a second segment 32*c* that are rigidly connected at an angle at an intermediate pivot point 32*d*, the first segment 32*a* of the lever arm 32 defines a distal end 32*b* that connects to the exterior upper end surface 12*a* of the upper end 12 of the hollow cylindrical member 10 with a first articulated connection 33, the intermediate pivot point 32*d* of the lever arm 32 connects to the base arm 31 with a second articulated connection 34. Wherein the installation tool 1 defines a resting position 1*a* and a release position 1*b*, the lever arm 32 of the handle 30 is configured to enable the transition between these two positions of the installation tool 1 by pivoting about its intermediate pivot point 32*d*. Wherein the user actuates the lever arm 32 of the handle 30 through its second segment 32*c* by either pulling it away from the base arm 31 of the handle 30 to transition to the resting position 1*a* of the installation tool 1 or pushing it against the base arm 31 of the handle 30 to transition to the release position 1*b* of the installation tool 1. Wherein the hollow cylindrical member 10 primarily projects from the lower surface 24 of the ring member 20 in the resting position 1*a* of the installation tool 1, thereby defining a projected portion 11*b* of the exterior sidewall surface 11*a* of the sidewall 11 of the hollow cylindrical member 10 that is configured to receive the piston boot 2 for its subsequent delivery to a service destination 5 within the air disc brake system 4. Wherein the hollow cylindrical member 10 primarily projects from the upper surface 23 of the ring member 20 in the release position 1*b* of the installation tool 1. Wherein the lower surface 24 of the ring member 20 effectively pushes the piston boot 2 downward toward the lower end 13 of the hollow cylindrical member 10 when transitioning from the resting position 1*a* of the installation tool 1 to the release position 1*b* of the installation tool 1, thereby gradually releasing the piston boot 2 from the projected portion 11*b* of the exterior sidewall surface 11*a* of the sidewall 11 of the hollow cylindrical member 10, the piston boot 2 is fully released from the projected portion 11*b* of the exterior sidewall surface 11*a* of the sidewall 11 of the hollow cylindrical member 10 when the release position 1*b* of the installation tool 1 is reached. And, wherein the hollow cylindrical member 10 is configured to receive the caliper piston 3 of the air disc brake system 4 in its internal cavity 14 through the lower aperture 13*a* in its lower end 13 to enable the delivery of the piston boot 2 to the service destination 5 within the air disc brake system 4 upon being fully released from the projected portion 11*b* of the exterior sidewall surface 11*a* of the sidewall 11 of the hollow cylindrical member 10 when transitioning from the resting position 1*a* of the installation tool 1 to the release position 1*b* of the installation tool 1.

In an embodiment of the present invention, the second articulated connection 34 between the intermediate pivot point 32*d* of the lever arm 32 of the handle 30 and the base arm 31 of the handle 30 is spring loaded.

In another embodiment of the present invention, the base arm 31 of the handle 30 comprises a resting position restraining pin 35 and a release position restraining pin 36 that limit the amplitude of the pivoting of the lever arm 32 of the handle 30 to prevent the dislocation of the hollow cylindrical member 10.

In yet another embodiment of the present invention, the installation tool 1 is made of a metal.

An advantage of the present invention is that it provides reduced installation time. The installation tool enables a faster and more efficient piston boot replacement process by simplifying the delivery and seating of the piston boot within the air disc brake assembly.

Another advantage of the present invention is that it minimizes the manual effort required for installation. The design of the tool, incorporating a pivoting handle mechanism and controlled release function, reduces the physical effort required by the technician during the installation procedure.

Another advantage of the present invention is that it improves installation quality. By guiding the piston boot along a defined path and gradually releasing it into position, the tool ensures that the boot is installed without damage or misalignment, enhancing the reliability of the brake system.

Another advantage of the present invention is that it generates consistent and repeatable results. The tool provides a controlled and repeatable installation process, reducing variability between service events and technicians and ensuring uniform quality of installation.

Another advantage of the present invention is that it enhances operational safety. Optional spring-loaded connections and restraining pins help prevent unintentional dislocation of tool components, improving user safety and operational precision. The invention is particularly suited for heavy truck and commercial vehicle air disc brake systems, where consistent, high-quality maintenance operations are essential for operational safety and regulatory compliance.

Still another advantage of the present invention is its durability. Embodiments of the tool made from metal provide durability and resilience in demanding workshop and field service environments.

The embodiments of the installation tool for a piston boot for a caliper piston of an air disc brake system herein are exemplary and numerous modifications, combinations, variations, and rearrangements can be readily envisioned to achieve an equivalent result, all of which are intended to be embraced within the scope of the appended claims. Further, nothing in the above-provided discussions of the installation tool for a piston boot for a caliper piston of an air disc brake system should be construed as limiting the invention to an embodiment or a combination of embodiments. The scope of the invention is defined by the description, drawings, and claims.

What is claimed is:

1. An installation tool for a piston boot for a caliper piston of an air disc brake system, the installation tool comprises:

a hollow cylindrical member that has a sidewall, an upper end and a lower end that collectively define an internal cavity, the sidewall defines an exterior sidewall surface, the upper end is closed and defines an exterior upper end surface, the lower end is open and defines a lower aperture;

a ring member that has an inner surface, an outer surface, an upper surface and a lower surface, the inner surface defines a central aperture, the hollow cylindrical member concentrically inserts into the central aperture of the ring member with the upper end of the hollow cylindrical member oriented upward and the lower end of the hollow cylindrical member oriented downward; and a handle fixedly attached to the outer surface of the ring member, the handle has a base arm and a lever arm, the lever arm defines a first segment and a second segment that are rigidly connected at an angle at an intermediate pivot point, the first segment of the lever arm defines a distal end that connects to the exterior upper end surface of the upper end of the hollow cylindrical member with a first articulated connection, the intermediate pivot point of the lever arm connects to the base arm with a second articulated connection;

wherein the installation tool defines a resting position and a release position, the lever arm of the handle is configured to enable the transition between these two positions of the installation tool by pivoting about its intermediate pivot point;

wherein the user actuates the lever arm of the handle through its second segment by either pulling it away from the base arm of the handle to transition to the resting position of the installation tool or pushing it against the base arm of the handle to transition to the release position of the installation tool;

wherein the hollow cylindrical member primarily projects from the lower surface of the ring member in the resting position of the installation tool, thereby defining a projected portion of the exterior sidewall surface of the sidewall of the hollow cylindrical member that is configured to receive the piston boot for its subsequent delivery to a service destination within the air disc brake system;

wherein the hollow cylindrical member primarily projects from the upper surface of the ring member in the release position of the installation tool;

wherein the lower surface of the ring member effectively pushes the piston boot downward toward the lower end of the hollow cylindrical member when transitioning from the resting position of the installation tool to the release position of the installation tool, thereby gradually releasing the piston boot from the projected portion of the exterior sidewall surface of the sidewall of the hollow cylindrical member, the piston boot is fully released from the projected portion of the exterior sidewall surface of the sidewall of the hollow cylindrical member when the release position of the installation tool is reached; and wherein the hollow cylindrical member is configured to receive the caliper piston of the air disc brake system in its internal cavity through the lower aperture in its lower end to enable the delivery of the piston boot to the service destination within the air disc brake system upon being fully released from the projected portion of the exterior sidewall surface of the sidewall of the hollow cylindrical member when transitioning from the resting position of the installation tool to the release position of the installation tool.

2. The installation tool for a piston boot for a caliper piston of an air disc brake system of claim 1, wherein the second articulated connection between the intermediate pivot point of the lever arm of the handle and the base arm of the handle is spring loaded.

3. The installation tool for a piston boot for a caliper piston of an air disc brake system of claim 1, wherein the base arm of the handle comprises a resting position restraining pin and a release position restraining pin that limit the amplitude of the pivoting of the lever arm of the handle to prevent the dislocation of the hollow cylindrical member.

4. The installation tool for a piston boot for a caliper piston of an air disc brake system of claim 1, wherein the installation tool is made of a metal.

* * * * *